(12) United States Patent
Koda et al.

(10) Patent No.: US 6,994,923 B2
(45) Date of Patent: Feb. 7, 2006

(54) MAGNETIC RECORDING MEDIUM, METHOD FOR PRODUCING THE SAME, AND MAGNETIC RECORDING APPARATUS

(75) Inventors: Tetsunori Koda, Moriya (JP); Akira Yano, Moriya (JP); Enji Fujita, Matsudo (JP); Tsuyoshi Onuma, Moriya (JP); Satoshi Matsunuma, Kamakura (JP)

(73) Assignee: Hitachi Maxell, Ltd., Osaka (JP)

( * ) Notice: Subject to any disclaimer, the term of this patent is extended or adjusted under 35 U.S.C. 154(b) by 28 days.

(21) Appl. No.: 10/460,197

(22) Filed: Jun. 13, 2003

(65) Prior Publication Data

US 2003/0235714 A1   Dec. 25, 2003

(30) Foreign Application Priority Data

Jun. 20, 2002 (JP) ............................. 2002-179854
Dec. 26, 2002 (JP) ............................. 2002-375960

(51) Int. Cl.
   *G11B 5/66* (2006.01)
   *G11B 5/70* (2006.01)

(52) U.S. Cl. .................................................. 428/828

(58) Field of Classification Search .......... 428/694 TS, 428/694 TM, 212, 668, 611, 900, 828
See application file for complete search history.

(56) References Cited

U.S. PATENT DOCUMENTS

| 2002/0015864 A1 | 2/2002 | Maesaka et al. ..... 428/694 TM |
| 2002/0048694 A1 * | 4/2002 | Mukai et al ........... 428/694 TS |

FOREIGN PATENT DOCUMENTS

| JP | A 2002-25030 | 1/2002 |
| JP | A 2002-25032 | 1/2002 |
| JP | A 2002-352408 | 12/2002 |
| JP | A 2002-352409 | 12/2002 |
| JP | A 2003-123245 | 4/2003 |

* cited by examiner

*Primary Examiner*—Holly Rickman
(74) *Attorney, Agent, or Firm*—Oliff & Berridge, PLC

(57) ABSTRACT

A magnetic recording medium in which the medium noise is reduced and information can be recorded at a high S/N level, and a method for producing the magnetic recording medium are provided. A magnetic recording apparatus, which is excellent in thermal stability and which makes it possible to perform the high density recording, is provided. When films are formed for the magnetic recording medium based on the perpendicular magnetic recording method, the content of B in a seed layer is made sufficiently larger than the content of B in a recording layer. Accordingly, B is diffused from the seed layer to the recording layer to facilitate the segregation of B at the crystal grain boundary in the recording layer. Thereby, the magnetic interaction between the crystal grains in the recording layer is further reduced. Thus, it is possible to greatly reduce the transition noise.

10 Claims, 3 Drawing Sheets

MAGNETIC RECORDING MEDIUM, METHOD FOR PRODUCING THE SAME, AND MAGNETIC RECORDING APPARATUS

BACKGROUND OF THE INVENTION

1. Field of the Invention

The present invention relates to a magnetic recording medium, a method for producing the same, and a magnetic recording apparatus. In particular, the present invention relates to a magnetic recording medium which is excellent in thermal stability, which makes it possible to perform the high density recording thereon, and which makes it possible to perform the reproduction at a low noise level. The present invention also relates to a method for producing such a magnetic recording medium and a magnetic recording apparatus.

2. Description of the Related Art

In recent years, the multimedia comes into widespread use in accordance with the development of the advanced information society. It becomes possible to process not only the text information but also the voice and image information at high speeds. One of the multimedia is represented by the magnetic recording apparatus. The magnetic recording apparatus includes a plurality of magnetic recording media which are rotatably installed onto a spindle. The development is advanced for the magnetic recording medium to be used for the magnetic recording apparatus in order to miniaturize the apparatus while further improving the recording density.

The magnetic recording medium comprises a substrate and a magnetic film formed thereon. Information is recorded on the magnetic recording medium by forming magnetic domains having specified directions of magnetization in the magnetic film. The conventional magnetic recording medium has used the in-plane magnetic recording method in which the magnetization is directed in the in-plane direction of the film. In this method, the high density recording on the magnetic recording medium was successfully achieved by making the magnetic crystal grains fine and minute and reducing the magnetic interaction between the respective grains. However, a problem has arisen such that the thermal stability of the recording magnetization is lowered due to the fine and minute magnetic crystal grains and the reduction of the interaction between the respective crystal grains.

The perpendicular magnetic recording method, in which the recording magnetization is directed in the vertical direction to the substrate, has been suggested as a method for solving the problem as described above. When this method is used, then the magnetostatically stable state is given between the adjoining recording bits, the thermal stability is improved, and the recording transition area is sharp. Further, when a layer formed of a soft magnetic material (hereinafter referred to as "soft magnetic backing layer") is added between the substrate and the recording layer of the magnetic recording medium based on the perpendicular magnetic recording method, it is possible to obtain a steep magnetic field to be applied to the recording layer. Therefore, it is possible to use a material having higher magnetic anisotropy for the recording layer. Accordingly, the thermal stability is further enhanced, and it is possible to perform the high density recording.

The studies have been principally directed to the CoCr-based alloy as a material for the recording layer of the magnetic recording medium based on the perpendicular magnetic recording method. The recording layer, which is formed of the CoCr-based alloy, has a two-phase separation structure composed of the crystal grains with a high Co concentration having the ferromagnetism and the non-magnetic crystal grain boundary with a high Cr concentration. The magnetic interaction between the crystal grains can be blocked by the non-magnetic crystal grain boundary. Therefore, the low noise level of the medium required for the high density recording has been realized.

In order to obtain a magnetic recording medium on which the high density recording is successfully performed at a lower noise level as compared with the magnetic recording medium based on the perpendicular magnetic recording method which uses the CoCr-based alloy for the recording layer, it is necessary to further enhance the thermal stability of the magnetization. For this purpose, it is necessary to use a material having higher magnetic anisotropy as compared with the CoCr-based alloy for the recording layer. Such a material may be exemplified, for example, by a multilayer film (artificial lattice film) obtained by alternately stacking Co and Pd or Co and Pt, and an ordered alloy composed of Fe and Pt or Co and Pt. However, the materials as described above have strong magnetic interaction between the crystal grains. Therefore, the following problem arises. That is, the size of the minimum magnetic domain is increased, and the transition noise is increased in the recording transition area between the adjoining recording bits during the recording.

In order to solve the problem as described above, a magnetic recording medium has been disclosed, for example, in Japanese Patent Application Laid-open No. 2002-25032 (pp. 2 to 4, FIG. 2), corresponding to U.S. Patent Application Publication No. U.S. 2002/0015864 A1, in which B element and O element are contained in a recording layer formed of an artificial lattice film. In this magnetic recording medium, 1 to 15 at. % of B is contained in the artificial lattice film. Accordingly, the crystalline isolation is improved for the crystal grains in the recording layer, and thus the transition noise is reduced. In this magnetic recording medium, the isolation of the crystal grains in the recording layer is further improved by containing 1 to 30 at. % of B in an underlayer of the recording layer.

As disclosed in Japanese Patent Application Laid-open No. 2002-25032, the following problem has arisen in the magnetic recording medium in which B is contained in the recording layer. That is, when B is contained in an excessive amount (for example, B having a value higher than 15 at. % in Japanese Patent Application Laid-open No. 2002-25032) in the recording layer in order to further enhance the isolation of the crystal grains in the recording layer, then B enters the crystal grains, the perpendicular magnetic anisotropy is deteriorated, and the transition noise is increased.

SUMMARY OF THE INVENTION

The present invention has been made in order to solve the problems involved in the conventional technique as described above, a first object of which is to provide a magnetic recording medium which is appropriate for the high density recording, a method for producing the same, and a magnetic recording apparatus by increasing the signal-to-noise ratio (S/N) by further reducing the transition noise between adjoining recording bits. A second object of the present invention is to provide a magnetic recording medium which is more excellent in thermal stability, a method for producing the same, and a magnetic recording apparatus.

According to a first aspect of the present invention, there is provided a magnetic recording medium comprising a substrate; a backing layer which is formed of a soft magnetic material on the substrate; a seed layer which is formed of a non-magnetic material on the backing layer; and a recording layer which is formed adjacently on the seed layer, which includes crystal grains containing a hard magnetic material and a crystal grain boundary containing a segregation component, and which exhibits perpendicular magnetization; wherein the segregation component has a concentration gradient in a film thickness direction in the recording layer so that the concentration of the segregation component decreases from a boundary surface of the recording layer disposed on a side of the seed layer toward a boundary surface at the recording layer disposed on a side opposite to the seed layer.

In the magnetic recording medium of the present invention, it is preferable that the segregation component contained in the recording layer is B (boron). It is preferable that the seed layer contains B, and an average concentration of B in the seed layer is higher than an average concentration of B in the recording layer. It is preferable that a relationship of B1>B2 holds between B1 and B2 provided that B1 represents a B concentration at the boundary surface of the recording layer disposed on the side of the seed layer, and B2 represents a B concentration at an intermediate position between the boundary surface of the recording layer disposed on the side of the seed layer and the boundary surface of the recording layer disposed on the side opposite to the seed layer (position in the recording layer at which the distance to the boundary surface disposed on the side of the seed layer is equal to the distance to the boundary surface disposed on the side opposite to the seed layer). That is, in the recording medium of the present invention, the concentration gradient of the segregation component B is generated in the film thickness direction in the recording layer. The concentration gradient is provided decreasingly in the direction directed from the boundary surface of the recording layer disposed on the side of the seed layer to the boundary surface disposed on the side opposite to the seed layer. It is considered that the concentration gradient of the segregation component B is formed by the diffusion of a part of B in the seed layer toward the recording layer, because the average concentration of B in the seed layer is higher than the average concentration of B in the recording layer. In the magnetic recording medium as described above, B, which is diffused from the seed layer to the recording layer, enters the crystal grain boundary in the recording layer. The segregation of B is facilitated at the crystal grain boundary, and the non-magnetization is facilitated at the crystal grain boundary. Accordingly, it is considered that the magnetic interaction is reduced between the crystal grains in the recording layer, and it is possible to greatly reduce the transition noise between the adjoining recording bits. Alternatively, in the magnetic recording medium of the present invention, C (carbon) may be used for the segregation component contained in the recording layer and the seed layer, as demonstrated in Examples described later on. It is possible to use, for example, Si, Al, and P as other segregation components. However, the segregation component is not limited to these elements, and it is possible to use arbitrary elements.

In the magnetic recording medium of the present invention, for example, when the segregation component is B, it is preferable that the B concentration B1 at the boundary surface of the recording layer disposed on the side of the seed layer is 17.0 to 70.0 at. %, and the B concentration B2 at the intermediate position between the boundary surface of the recording layer disposed on the side of the seed layer and the boundary surface of the recording layer disposed on the side opposite to the seed layer is 6.0 to 17.0 at. %. It is preferable that the concentration gradient of B is provided at 0.2 to 4.2 at. %/nm in the film thickness direction in the recording layer.

In the magnetic recording medium of the present invention, it is preferable that the recording layer is formed of a multilayer film obtained by alternately stacking a platinum family metal containing B and Co containing B. In particular, it is desirable that the platinum family metal is at least one of Pt and Pd. It is preferable that oxygen is contained in a content of not more than 10 at. % in the recording layer.

In the magnetic recording medium of the present invention, it is preferable that the soft magnetic backing layer is formed of an alloy principally composed of at least one of Co and Fe and containing at least one element of B and C therein. The soft magnetic backing layer may be formed of an amorphous alloy principally composed of CoZr and containing at least one element selected from the group consisting of Ta, Nb, and Ti therein. The soft magnetic backing layer may be formed of an alloy having a structure obtained by dispersing a nitride or a carbide of at least one element selected from the group consisting of Ta, Nb, and Zr in Fe.

According to a second aspect of the present invention, there is provided a method for producing a magnetic recording medium, comprising a first step of forming a backing layer of a soft magnetic material on a substrate; a second step of forming a seed layer of a seed layer-forming material containing a non-magnetic material on the backing layer; and a third step of forming a recording layer of a recording layer-forming material containing a hard magnetic material and a specified component adjacently on the seed layer; wherein the seed layer-forming material contains the specified component, and a condition of SS>SR holds between a content SS of the specified component in the seed layer-forming material and a content SR of the specified component in the recording layer-forming material.

In the method for producing the magnetic recording medium of the present invention, the films are formed so that the condition of SS>SR is established between the content SS of the specified component in the seed layer-forming material and the content SR of the specified component in the recording layer-forming material when the recording layer is deposited adjacently on the seed layer.

In the method for producing the magnetic recording medium of the present invention, it is preferable that the specified component is B. In the method for producing the magnetic recording medium of the present invention, as for the material which exhibits the high perpendicular magnetic anisotropy, it is preferable that the recording layer, for example, is formed of a multilayer film obtained by alternately stacking non-magnetic layers formed of a platinum family metal and B and magnetic layers formed of Co and B. In particular, it is preferable that the platinum family metal is at least one of Pd and Pt. Alternatively, in the method for producing the magnetic recording medium of the present invention, C may be used for the specified component as demonstrated in Examples described later on. For example, Si, Al, and P may be used as other specified components. However, the specified component is not limited to these elements, and it is possible to use arbitrary elements.

In the method for producing the magnetic recording medium of the present invention, the specified component is segregated at the crystal grain boundary of the recording layer by containing the specified component in the recording layer so that the crystal grain boundary is non-magnetized to reduce the magnetic interaction between the respective crystal grains. However, if the specified component is contained in an excessive amount in the recording layer, then the specified component enters the crystal grains, and the magnetic characteristics of the recording layer are consequently deteriorated. Therefore, when the recording layer is formed of B as the specified component, it is preferable that the content BR of B in the recording layer-forming material is 5.0 to 15.0 at. %.

In the method for producing the magnetic recording medium of the present invention, when B is used as the specified component, the content BS of B, which is adopted when the seed layer is formed in the second step, is made sufficiently larger than the content BR of B which is adopted when the recording layer is formed in the third step. In the method for producing the magnetic recording medium of the present invention, it is preferable that the content BS of B in the seed layer-forming material is 33.0 to 100.0 at. %, and the content BR of B in the recording layer-forming material is made smaller than BS. When the recording layer is stacked on the seed layer under the film formation condition as described above, a part of B in the seed layer is diffused toward the recording layer during the stacking process, owing to the difference in content of B between the seed layer and the recording layer. During this process, B, which is diffused from the seed layer to the recording layer, principally enters the crystal grain boundary in which B tends to be diffused as compared with the crystal grains in the recording layer. Therefore, the diffusion of B from the seed layer to the recording layer further increases the B concentration at the crystal grain boundary of the recording layer, and the segregation of B is facilitated at the crystal grain boundary. As a result, the magnetic interaction is further decreased between the crystal grains in the recording layer, and it is possible to greatly reduce the transition noise between the adjoining recording bits.

In particular, in the method for producing the magnetic recording medium of the present invention, it is preferable that the content BS of B in the seed layer-forming material is 33.0 to 100.0 at. %, and the content BR of B in the recording layer-forming material is 5.0 to 15.0 at. %.

In the method for producing the magnetic recording medium of the present invention, it is preferable that the recording layer is formed by means of sputtering in the third step. During this process, it is preferable that oxygen is mixed at a concentration of not more than 0.5% by volume in a sputtering gas. Further, it is preferable that Kr gas is used as a sputtering gas.

In the method for producing the magnetic recording medium of the present invention, it is preferable that an annealing treatment is performed at a temperature of 100 to 500° C. in an oxygen atmosphere after forming the recording layer in the third step when B is used as the specified component. Owing to the annealing treatment, the diffusion of B from the seed layer to the recording layer is further facilitated.

According to a third aspect of the present invention, there is provided a magnetic recording apparatus comprising the magnetic recording medium according to the first aspect, a magnetic head which records or reproduces information on the magnetic recording medium, and a drive unit which drives the magnetic recording medium with respect to the magnetic head.

BRIEF DESCRIPTION OF THE DRAWINGS

FIG. 3 schematically shows a magnetic recording apparatus provided with the magnetic disks manufactured in Example 1, wherein

DESCRIPTION OF THE PREFERRED EMBODIMENTS

The magnetic recording medium of the present invention, the method for producing the magnetic recording medium, and the magnetic recording apparatus will be specifically explained below with reference to Examples. However, the present invention is not limited thereto.

EXAMPLE 1

Figure 1:
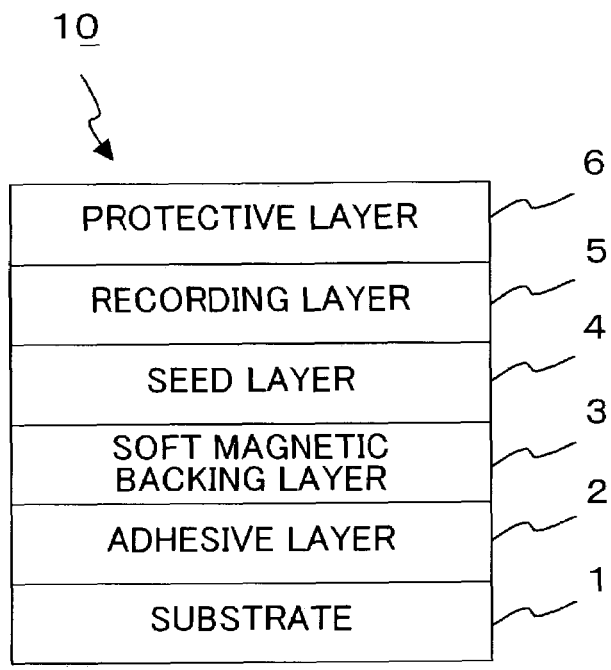
FIG. 1 shows a schematic sectional view illustrating a magnetic disk manufactured in Example 1.

FIG. 1 shows a schematic sectional view illustrating a magnetic disk manufactured in Example 1. As shown in FIG. 1, the magnetic disk 10 was manufactured by successively stacking, on a substrate 1, an adhesive layer 2, a soft magnetic backing layer 3, a seed layer 4, a recording layer 5, and a protective layer 6. The adhesive layer 2 is the layer for avoiding any exfoliation between the substrate 1 and the stacked films. The soft magnetic backing layer 3 is the layer for steeping the magnetic field to be applied to the recording layer 5 during the recording of information. The seed layer 4 is the layer for forming the recording layer 5 on the seed layer 4 so that the crystal grains of the recording layer 5 are uniform in size. The recording layer 5 is the layer for recording information as magnetization information. The direction of magnetization of the recording layer 5 is in the vertical direction with respect to the film surface. The protective layer 6 is the layer for protecting the stacked films 2 to 5 successively stacked on the substrate 1.

A glass substrate having a diameter of 2.5 inches (6.25 cm) was prepared as the substrate 1. A Ti film was formed as the adhesive layer 2 thereon by means of the DC magnetron sputtering method in an Ar gas atmosphere. The adhesive layer 2 had a film thickness of 5 nm.

Subsequently, a CoB film was formed as the soft magnetic backing layer 3 on the adhesive layer 2 by means of the DC magnetron sputtering method by using a $Co_{85}B_{15}$ alloy target in an Ar gas atmosphere. The soft magnetic backing layer 3 had a film thickness of 200 nm.

Further, a PdB film was formed as the seed layer 4 on the soft magnetic backing layer 3. The film was formed by using the co-sputtering method in an Ar gas atmosphere. The DC magnetron sputtering method was used for Pd and the RF magnetron sputtering method was used for B to make the adjustment so that the composition of the seed layer 4 was $Pd_{67}B_{33}$. The seed layer 4 had a film thickness of 4 nm.

A CoB/PdB alternately stacked film was formed as the recording layer 5 to exhibit the perpendicular magnetization on the seed layer 4 formed as described above. The following film formation method was used for the CoB/PdB alternately stacked film. That is, the DC magnetron sputtering was performed while alternately opening/closing shutters for opening/closing a Co target and a Pd target in an Ar gas atmosphere to form the multilayer film by alternately stacking magnetic layers principally composed of Co and metal layers principally composed of Pd. In this process, twenty-five layers of the Co layers of 0.14 nm and the Pd layers of 0.94 nm were stacked respectively. B was contained in the multilayer film by performing the co-sputtering by means of the RF magnetron sputtering method during the formation of the alternately stacked film. During this process, the adjustment was made so that the content of B in the recording layer 5 was 12 at. %.

Finally, a C film was formed as the protective layer 6 on the recording layer 5 by means of the RF magnetron sputtering method in an Ar gas atmosphere. The protective layer 6 had a film thickness of 3 nm.

The structure of the magnetic disk manufactured in this embodiment was analyzed with a high resolution transmission electron microscope (TEM). Although the result of the analysis with TEM is not shown, the crystal grains and the crystal grain boundary of the recording layer were clearly observed according to the in-plane TEM observation. According to the high-angle annular dark-field scattering image (HAADF-STEM image), it was successfully confirmed that a large amount of the light element was present at the crystal grain boundary of the recording layer, revealing that B was segregated at the crystal grain boundary of the recording layer.

Figure 2:
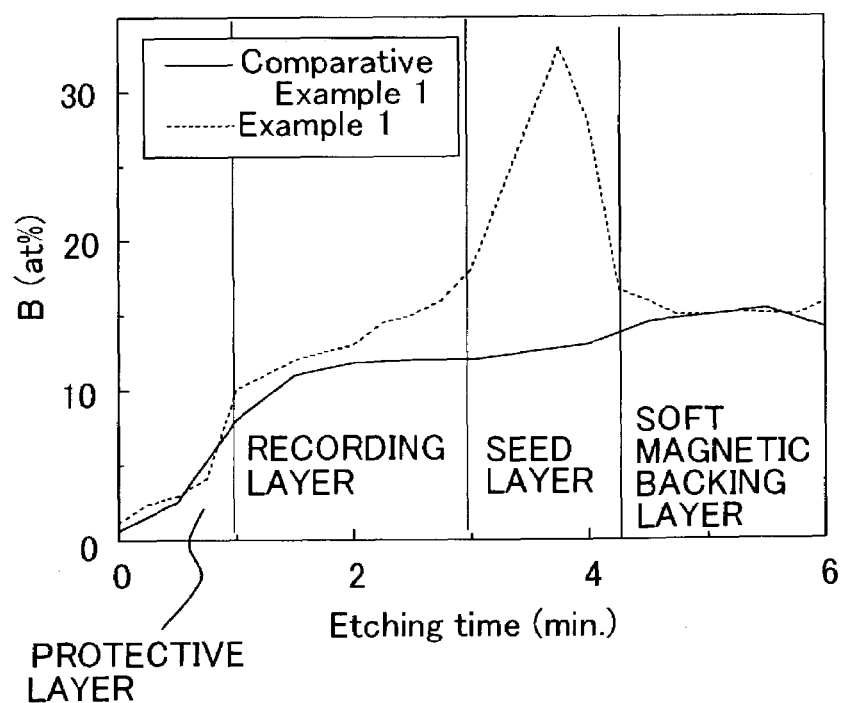
FIG. 2 shows distributions of B concentrations in the film thickness direction of the magnetic disks manufactured in Example 1 and Comparative Example 1.

Subsequently, the distribution in the film thickness direction of the concentration of B contained in the magnetic disk manufactured in this embodiment was analyzed by means of the X-ray photoelectron spectroscopy (XPS). An obtained result is shown in FIG. 2. The broken line in FIG. 2 indicates the distribution of the B concentration in the film thickness direction in the magnetic disk of Example 1. However, in this experiment, the etching and the measurement of the B concentration by means of the XPS were repeatedly performed from the side of the protective layer to investigate the distribution of the B concentration in the film thickness direction. Therefore, the horizontal axis in FIG. 2 is represented by the etching time. As shown in FIG. 2, the etching time of 0 to about 1 minute corresponds to the area of the protective layer, the etching time of about 1 minute to about 3 minutes corresponds to the area of the recording layer, the etching time of about 3 minutes to about 4.25 minutes corresponds to the area of the seed layer, and the etching time of about 4.25 minutes and the followings corresponds to the area of the soft magnetic backing layer.

As shown in FIG. 2, the B concentration is decreased in the direction directed from the boundary surface with respect to the seed layer to the boundary surface with respect to the protective layer in the recording layer of the magnetic disk manufactured in Example 1. A gradient of the B concentration appears in the film thickness direction in the recording layer, for the following reason. That is, it is considered that a part of B contained in the seed layer was diffused to the recording layer during the film formation of the recording layer. The B concentration is 17.0 at. % in the vicinity of the boundary surface between the recording layer and the seed layer, in which the amount of diffusion of B is increased and the B concentration is increased, because the position is close to the seed layer, as compared with the B concentration of 12.5 at. % at an intermediate position between the boundary surface of the recording layer disposed on the side of the seed layer and the boundary surface of the recording layer disposed on the side of the protective layer. However, the amount of diffusion of B is decreased and the B concentration is decreased at positions approaching the protective layer from the boundary surface between the recording layer and the seed layer, because the positions are progressively separated from the seed layer. The B concentration in the vicinity of the boundary surface between the recording layer and the seed layer was determined for the boundary surface between the recording layer and the seed layer on the basis of the point of intersection between a tangent line of the B concentration distribution curve at a position of the measurement of the B concentration at an etching time of 3.2 minutes disposed on the side of the seed layer and a tangent line of the B concentration distribution curve at a position of the measurement of the B concentration at an etching time of 2.8 minutes disposed on the side of the recording layer. On the other hand, the B concentration at the intermediate position between the boundary surface of the recording layer disposed on the side of the seed layer and the boundary surface of the recording layer disposed on the side of the protective layer was determined in accordance with the following method. That is, at first, the B concentration in the vicinity of the boundary surface between the protective layer and the recording layer was determined in accordance with the same method as the method for determining the B concentration in the vicinity of the boundary surface between the recording layer and the seed layer. Subsequently, the intermediate position in the recording layer was determined on the basis of the both boundary surfaces. The B concentration at the intermediate position in the recording layer was determined from the positions of the both boundary surfaces of the recording layer, the B concentrations, and the intermediate position.

In the magnetic disk manufactured in this embodiment, the average B concentration of the recording layer was 15 at. % and the average B concentration of the seed layer was 28 at. % after the film formation. A part of B is diffused to outflow to the recording layer from the seed layer. Therefore, the average B concentration of the seed layer after the film formation was smaller than the B content (33 at. %) of the seed layer-forming material upon the film formation. On the other hand, B inflows into the recording layer in accordance with the diffusion from the seed layer. Therefore, the average B concentration of the recording layer after the film formation was larger than the B content (12 at. %) in the recording layer-forming material upon the film formation.

Subsequently, a lubricant (not shown) was applied onto the protective layer 6 of the magnetic disk 10 manufactured in this embodiment, and then the recording and reproduction characteristics of the magnetic disk 10 were evaluated. A single magnetic pole head, which was suitable for the perpendicular magnetic recording, was used for the recording. A spin-valve type GMR magnetic head was used for the reproduction. The distance between the magnetic head surface and the magnetic disk surface was maintained to be 10 nm. As a result of the evaluation of the magnetic disk 10, Slf/Nd=23.1 dB was obtained. Slf represents the reproduction output obtained when a signal having a linear recording density of 20 kFCI is subjected to the recording, and Nd represents the noise level obtained when a signal having a linear recording density of 450 kFCI is subjected to the recording. Slf/Nd serves as an index of the signal-to-noise ratio of the medium.

Figure 3A:
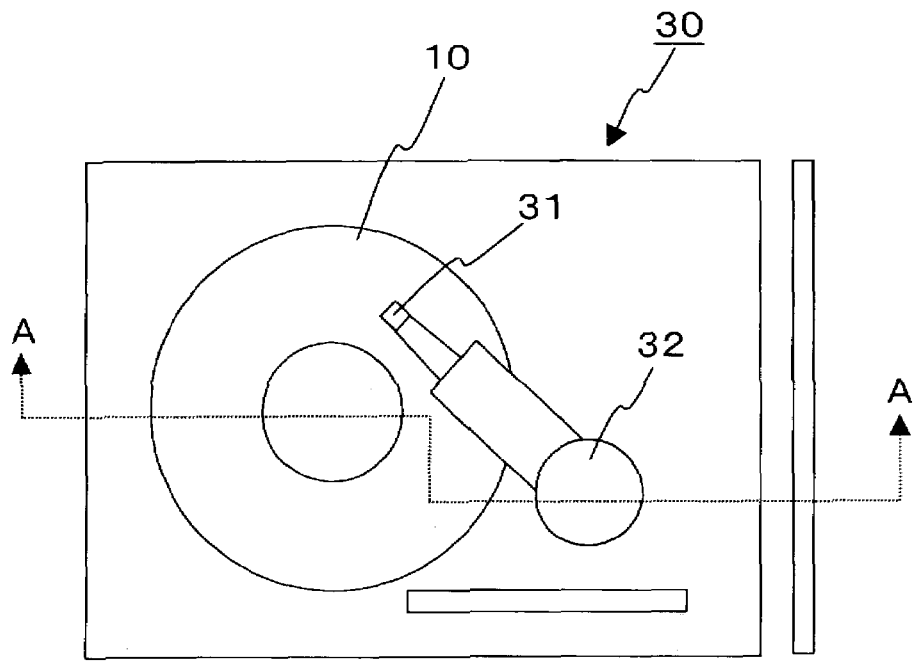
FIG. 3A shows a plan view.
Figure 3B:
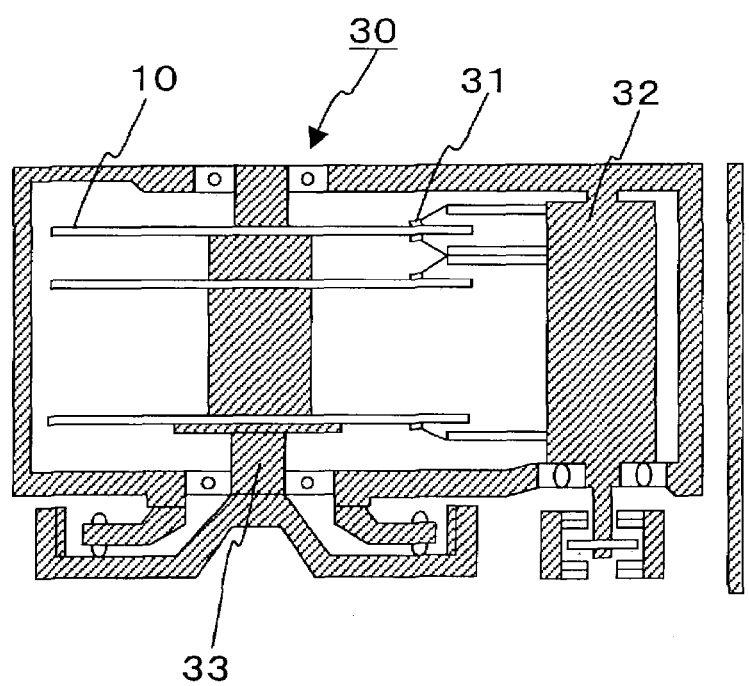
FIG. 3B shows a sectional view taken along a line A—A shown in FIG. 3A.

The magnetic disks 10 manufactured in this embodiment were incorporated into a magnetic recording apparatus to evaluate the recording and reproduction characteristics. FIG. 3A shows a schematic plan view illustrating the magnetic recording apparatus, and FIG. 3B shows a schematic sectional view thereof. As shown in FIGS. 3A and 3B, the magnetic recording apparatus 30 used in this embodiment principally comprises a magnetic head 31, a magnetic head drive unit 32 for controlling the magnetic head 31, and a spindle 33 for coaxially rotating the plurality of magnetic disks 10. The magnetic head 31 includes a recording magnetic head and a reproducing magnetic head which are integrated into one unit. A dual spin-valve type magnetic head having a high saturation magnetic flux density of 2.1 T was used for the recording magnetic head.

The magnetic disks 10 manufactured in this embodiment were installed to the magnetic recording apparatus 30 as shown in FIG. 3 to perform a playback test for the magnetic disks 10. A signal corresponding to 60 Gbits/inch$^2$ was subjected to the recording on the magnetic disk 10. The distance between the surface of the magnetic head 31 and the surface of the magnetic disk 10 of the magnetic recording apparatus 30 was maintained to be 10 nm. As a result of the playback test, a reproduced signal having a signal-to-noise ratio S/N=30 dB was obtained. The error rate was not more than $1 \times 10^{-5}$ when no signal processing was performed.

COMPARATIVE EXAMPLE 1

In Comparative Example 1, a magnetic disk was manufactured in the same manner as in Example 1 except that the magnetic disk was manufactured by controlling the content of B upon the film formation of a seed layer to be 12 at. % in materials for forming the seed layer, i.e., Pd:B=88:12. The B content of the seed layer had the same value as that of the B content upon the formation of the recording layer.

The concentration distribution of B contained in the magnetic disk manufactured in Comparative Example 1 was analyzed by means of the X-ray photoelectron spectroscopy (XPS) in the same manner as in Example 1. An obtained result is shown in FIG. 2. The solid line in FIG. 2 indicates the distribution of the B concentration in the film thickness direction in the magnetic disk of Comparative Example 1. As shown in FIG. 2, the gradient of the B concentration was almost absent in the recording layer in the magnetic disk manufactured in Comparative Example 1 as compared with the result of Example 1 (broken line shown in FIG. 2), for the following reason. That is, it is considered that the diffusion of B from the seed layer to the recording layer was not caused during the film formation of the recording layer, because the B content of the seed layer upon the film formation had the same value as that of the recording layer. When the result of Example 1 is compared with that of Comparative Example 1 for the B concentration in the recording layer, the B concentration in the recording layer of the magnetic disk manufactured in Example 1 was larger than that manufactured in Comparative Example 1 as shown in FIG. 2. It is considered that the difference in concentration corresponds to the amount of diffusion of B diffused from the seed layer to the recording layer.

Slf/Nd was measured for the magnetic disk manufactured in Comparative Example 1 in the same manner as in Example 1. An obtained result is shown in Table 1 together with the result of Example 1. In Table 1, BR represents the B content upon the film formation of the recording layer, BS represents the B content upon the film formation of the seed layer, B1 represents the B concentration in the vicinity of the boundary surface between the recording layer and the seed layer after the film formation, and B2 represents the B concentration at the intermediate position between the boundary surface of the recording layer disposed on the side of the seed layer and the boundary surface of the recording layer disposed on the side of the protective layer.

TABLE 1

| | Slf/Nd (dB) | BS (at. %) | BR (at. %) | B1 (at. %) | B2 (at. %) |
|---|---|---|---|---|---|
| Example 1 | 23.1 | 33.0 | 12.0 | 17.0 | 12.5 |
| Comp. Ex. 1 | 18.1 | 12.0 | 12.0 | 12.0 | 11.0 |

As shown in Table 1, the magnetic disk manufactured in Comparative Example 1 provided Slf/Nd=18.1 dB which was a value lower than that of the magnetic disk of Example 1, for the following reason. That is, it is considered that the diffusion of B from the seed layer to the recording layer was scarcely caused, and the segregation of B at the crystal grain boundary in the recording layer was not facilitated, because the B content of the seed layer had the same value as that of the recording layer. Therefore, the following fact is considered to be affirmed. That is, when the B content of the seed layer upon the film formation is made sufficiently larger than that of the recording layer as in Example 1, then B is diffused from the seed layer to the recording layer, the segregation of B is facilitated at the crystal grain boundary of the recording layer, and the transition noise is reduced. Accordingly, Slf/Nd is increased.

EXAMPLE 2

In Example 2, a variety of magnetic disks were manufactured in the same manner as in Example 1 except that the magnetic disks were manufactured by changing the B content of the seed layer within a range of 33.0 to 100.0 at. % and the B content of the recording layer within a range of 5.0 to 15.0 at. % respectively upon the film formation of the magnetic disks.

Slf/Nd was measured for the variety of magnetic disks manufactured in this embodiment in the same manner as in Example 1. Obtained results are shown in Table 2. In Table 2, BR represents the B content upon the film formation of the recording layer, BS represents the B content upon the film formation of the seed layer, B1 represents the B concentration in the vicinity of the boundary surface between the recording layer and the seed layer after the film formation, and B2 represents the B concentration at the intermediate position between the boundary surface of the recording layer disposed on the side of the seed layer and the boundary surface of the recording layer disposed on the side of the protective layer. The results of Example 1 and Comparative Example 1 are also shown in Table 2.

TABLE 2

| BS (at. %) | BR (at. %) | B1 (at. %) | B2 (at. %) | Slf/Nd (dB) |
|---|---|---|---|---|
| 12.0 (Comp. Ex. 1) | 12.0 | 12.0 | 11.0 | 18.1 |
| 33.0 (Example 1) | 12.0 | 17.0 | 12.5 | 23.1 |
| 33.0 | 5.0 | 18.0 | 6.0 | 22.3 |
| 33.0 | 15.0 | 20.0 | 17.0 | 22.0 |
| 50.0 | 10.0 | 30.0 | 10.3 | 26.0 |
| 100.0 | 5.0 | 70.0 | 8.5 | 24.2 |
| 100.0 | 15.0 | 60.0 | 17.0 | 23.5 |

As shown in Table 2, it was revealed that Slf/Nd of not less than 22.0 dB was obtained when the B content BS of the seed layer upon the film formation was 33.0 to 100.0 at. %, the B content BR of the recording layer upon the film formation was 5.0 to 15.0 at. %, and the difference in content between BS and BR was 18.0 to 95.0 at. %. On this condition, B1 in the recording layer of the magnetic disk was 18.0 to 70.0 at. %, and B2 was 6.0 to 17.0 at. %.

EXAMPLE 3

In Example 3, a magnetic disk was manufactured in the same manner as in Example 1 except that the sputtering was performed by mixing oxygen at a flow rate ratio of 0.5% by volume with respect to the Ar gas during the film formation of the recording layer. The composition of the obtained recording layer in the film thickness direction was investigated by means of the Auger electron spectroscopy (AES). As a result, it was revealed that oxygen was contained in an amount of about 3 at. % as represented by the composition ratio. Slf/Nd was measured for the magnetic disk manufactured in this embodiment in the same manner as in Example 1. As a result, Slf/Nd=25 dB was obtained, i.e., the value higher than that of Slf/Nd of the magnetic disk of Example 1 was obtained, for the following reason. That is, it is considered that oxygen is contained in the recording layer by mixing the small amount of oxygen in the sputtering gas during the film formation of the recording layer, and thus the diffusion of B from the seed layer to the recording layer was facilitated.

EXAMPLE 4

In Example 4, a magnetic disk was manufactured in the same manner as in Example 1 except that Kr gas was used in place of Ar gas during the film formation of the seed layer and the recording layer, and the sputtering was performed by mixing oxygen at a flow rate ratio of 0.5% by volume with respect to the Kr gas during the film formation of the recording layer. The composition of the obtained recording layer in the film thickness direction was investigated by means of the Auger electron spectroscopy (AES). As a result, it was revealed that oxygen was contained in an amount of about 3 at. % as represented by the composition ratio.

Figure 4:
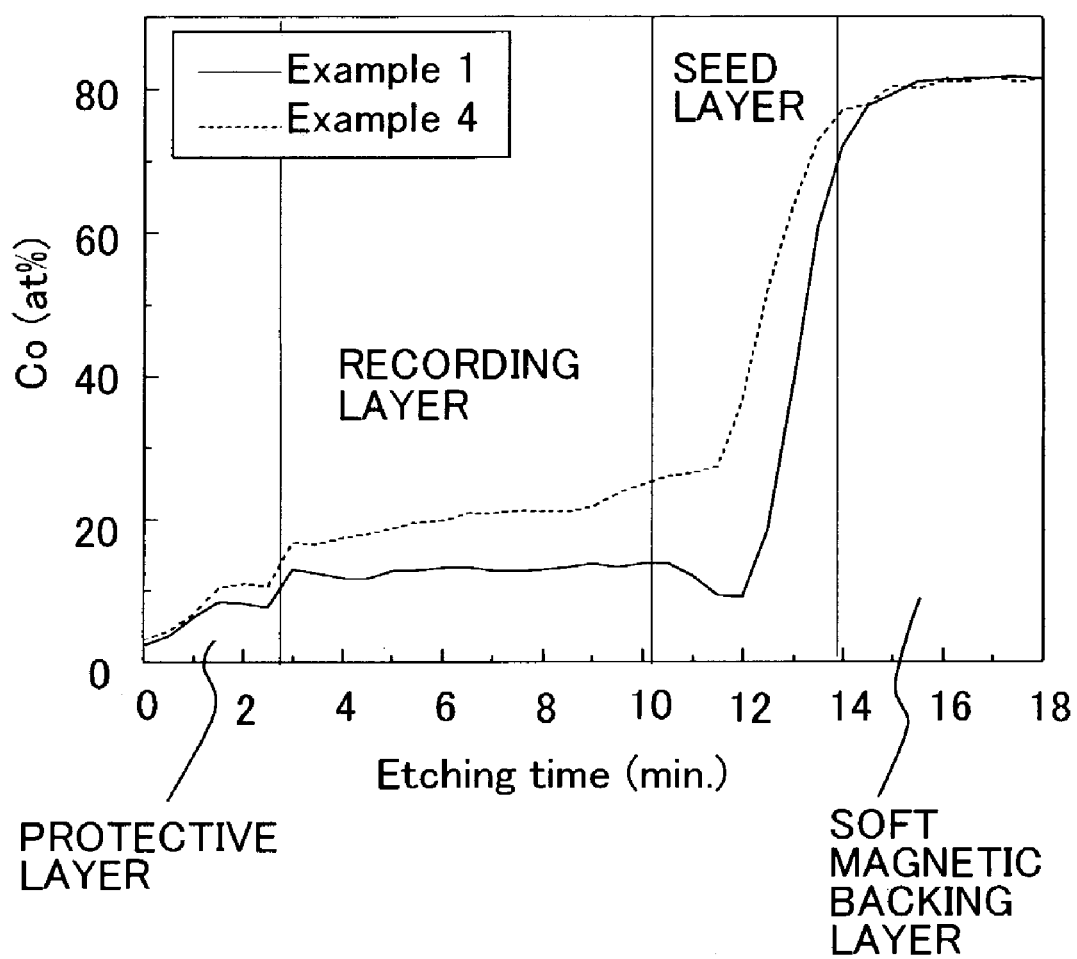
FIG. 4 shows distributions of Co concentrations in the film thickness direction of the magnetic disks manufactured in Example 1 and Example 4.

The distribution in the film thickness direction of the concentration of Co contained in the magnetic disk manufactured in this embodiment was analyzed by means of the Auger electron spectroscopy (AES). An obtained result is shown in FIG. 4. FIG. 4 also shows the distribution of the Co concentration of the magnetic disk manufactured in Example 1. In FIG. 4, the broken line indicates the distribution in the film thickness direction of the Co concentration of the magnetic disk of Example 4, and the solid line indicates the distribution in the film thickness direction of the Co concentration of the magnetic disk of Example 1. However, in this experiment, the etching and the measurement of the Co concentration based on AES were repeatedly performed from the side of the protective layer of the magnetic disk to investigate the distribution of the Co concentration in the film thickness direction. Therefore, the horizontal axis in FIG. 4 is represented by the etching time. As shown in FIG. 4, the etching time of 0 to about 2.8 minutes corresponds to the area of the protective layer, the etching time of about 2.8 minutes to about 10.2 minutes corresponds to the area of the recording layer, the etching time of about 10.2 minutes to about 14 minutes corresponds to the area of the seed layer, and the etching time of about 14 minutes and the followings corresponds to the area of the soft magnetic backing layer.

As shown in FIG. 4, it was revealed that Co was diffused from the soft magnetic backing layer to the seed layer in both of Examples 1 and 4, and the amount of diffusion of Co was larger in the magnetic disk of Example 4. Although not shown, in the magnetic disk of Example 4, the amount of diffusion of B from the seed layer to the recording layer was also increased as compared with Example 1, and the average B concentration in the recording layer was further increased to be 17 at. % as compared with the average B concentration (15 at. %) in the recording layer of the magnetic disk manufactured in Example 1. That is, it has been revealed that the diffusion of Co and B is facilitated by changing the sputtering gas from the Ar gas to the Kr gas. This is considered to be caused for the following reason. That is, the energy possessed by the sputtered particles of Kr is larger than that of Ar, because the molecular weight of Kr gas is larger than the molecular weight of Ar gas. The energy of the particles sputtered from the target is large as well. Accordingly, the amount of movement of atoms is increased during the film formation, and the diffusion of Co and B is facilitated.

Subsequently, Slf/Nd was measured for the magnetic disk manufactured in this embodiment in the same manner as in Example 1. An obtained result is shown in Table 3 together with the results of the magnetic disks manufactured in Examples 1 and 3.

TABLE 3

|  | Slf/Nd (dB) | Film formation gas for seed layer | Film formation gas for recording layer |
| --- | --- | --- | --- |
| Example 1 | 23.1 | Ar | Ar |
| Example 3 | 25.0 | Ar | Ar + $O_2$ |
| Example 4 | 27.0 | Kr | Kr + $O_2$ |

In the magnetic disk manufactured in this embodiment, as shown in Table 3, Slf/Nd=27 dB was obtained, i.e., Slf/Nd higher than those of the magnetic disks of Examples 1 and 3 was obtained, for the following reason. That is, it is considered that the amount of diffusion of B from the seed layer to the recording layer was increased for the reason as described above by using, as the film formation gas, the Kr gas having the molecular weight larger than that of the Ar gas, the segregation of B was facilitated at the crystal grain boundary in the recording layer, and the magnetic interaction between the magnetic material crystals was further reduced.

The magnetic disks manufactured in this embodiment were installed to the magnetic recording apparatus 30 shown in FIG. 3 in the same manner as in Example 1 to perform the playback test for the magnetic disks. As a result, a reproduced signal having a signal-to-noise ratio S/N=32 dB was obtained, i.e., S/N higher than that obtained in Example 1 (30 dB) was obtained. The error rate was not more than $1 \times 10^{-5}$ when no signal processing was performed.

EXAMPLE 5

In Example 5, a magnetic disk was manufactured in the same manner as in Example 1 except that a $Co_{88}Ta_{10}Zr_2$ film was formed as the soft magnetic backing layer by performing the DC sputtering with a $Co_{88}Ta_{10}Zr_2$ alloy target. Slf/Nd was also measured for the magnetic disk manufactured in this embodiment in the same manner as in Example 1. As a result, Slf/Nd=23.1 dB was obtained, i.e., approximately the same result as that of the magnetic disk manufactured in Example 1 was obtained.

EXAMPLE 6

In Example 6, a magnetic disk was manufactured in the same manner as in Example 1 except that an $Fe_{79}Ta_9C_{12}$ film was formed as the soft magnetic backing layer by performing the DC sputtering with an $Fe_{79}Ta_9C_{12}$ alloy target. However, the heat was applied for 30 seconds at 500° C. in vacuum after the film formation of the soft magnetic backing layer to microcrystallize Fe in the soft magnetic backing layer 3.

Slf/Nd was measured for the magnetic disk manufactured in this embodiment in the same manner as in Example 1. An obtained result is shown in Table 4 together with the results of Examples 1 and 5. As shown in Table 4, Slf/Nd=22.8 dB was obtained for the magnetic disk of this embodiment. Approximately the same result as that of the magnetic disk manufactured in Example 1 was obtained.

TABLE 4

| | Slf/Nd (dB) | Soft magnetic backing layer |
|---|---|---|
| Example 1 | 23.1 | CoB |
| Example 5 | 23.1 | CoTaZr |
| Example 6 | 22.8 | FeTaC |

EXAMPLE 7

In Example 7, a magnetic disk was manufactured in the same manner as in Example 1 except that an annealing treatment was performed for 60 minutes at 200° C. in an oxygen atmosphere after the film formation of the recording layer. In this embodiment, the annealing temperature was 200° C. However, the annealing temperature is arbitrary provided that the temperature is within a range of 100 to 500° C. Slf/Nd was measured for the magnetic disk manufactured in this embodiment in the same manner as in Example 1. As a result, Slf/Nd=24.0 dB was obtained.

EXAMPLE 8

In Example 8, a magnetic disk was manufactured in the same manner as in Example 1 except that a C target was used in place of the B target during the film formation of the seed layer and the recording layer. The C concentration in the film thickness direction was measured by means of AES for the magnetic disk manufactured in this embodiment. As a result, the concentration of C contained in the recording layer in the vicinity of the boundary surface between the seed layer and the recording layer was 18.0 at. %, and the concentration of C at the intermediate position in the film thickness direction in the recording layer was 15.0 at. %. Further, it was revealed that the C concentration was decreased at positions approaching the boundary surface disposed on the side of the protective layer from the boundary surface of the recording layer disposed on the side of the seed layer. The average C concentration of the recording layer was 18.0 at. %, and the average C concentration of the seed layer was 29.0 at. %. Slf/Nd was measured for the magnetic disk manufactured in this embodiment in the same manner as in Example 1. As a result, Slf/Nd=23.1 dB was obtained.

COMPARATIVE EXAMPLE 2

In Comparative Example 2, a magnetic disk was manufactured in the same manner as in Example 8 except that the magnetic disk was manufactured by controlling the content of C upon the film formation of a seed layer to be 12 at. % in materials for forming the seed layer, i.e., Pd:C=88:12. The C content of the seed layer had the same value as that of the C content upon the formation of the recording layer. The C concentration in the film thickness direction was also measured by means of AES for the magnetic disk manufactured in Comparative Example 2. As a result, the C concentration of the recording layer in the vicinity of the boundary surface between the recording layer and the seed layer was 12.0 at. %, and the C concentration at the intermediate position in the film thickness direction in the recording layer was 12.0 at. %. The average C concentration of the recording layer was 12.0 at. %, and the average C concentration of the seed layer was 12.0 at. %. The decrease in C concentration in the direction directed from the boundary surface disposed on the side of the seed layer to the boundary surface disposed on the side of the protective layer in the recording layer, which was observed in the magnetic disk manufactured in Example 8, was not observed for the magnetic disk manufactured in Comparative Example 2. That is, the concentration gradient of C did not appear in the film thickness direction of the recording layer in the magnetic disk manufactured in Comparative Example 2. Slf/Nd was measured for the magnetic disk manufactured in Comparative Example 2 in the same manner as in Example 1. As a result, Slf/Nd=18.0 dB was obtained.

EXAMPLE 9

In Example 9, a magnetic disk was manufactured in the same manner as in Example 1 except that a Pt target was used in place of the Pd target during the film formation of the seed layer and the recording layer. The B concentration in the film thickness direction was measured by means of AES for the magnetic disk manufactured in this embodiment. As a result, the B concentration of the recording layer in the vicinity of the boundary surface between the seed layer and the recording layer was 18.5 at. %, and the B concentration at the intermediate position in the film thickness direction in the recording layer was 15.5 at. %. Further, it was revealed that the B concentration was decreased at positions approaching the boundary surface disposed on the side of the protective layer from the boundary surface disposed on the side of the seed layer in the recording layer. The average B concentration of the recording layer was 17.0 at. %, and the average B concentration of the seed layer was 28.0 at. %. Slf/Nd was measured for the magnetic disk manufactured in this embodiment in the same manner as in Example 1. As a result, Slf/Nd=22.0 dB was obtained.

COMPARATIVE EXAMPLE 3

In Comparative Example 3, a magnetic disk was manufactured in the same manner as in Example 9 except that the magnetic disk was manufactured by controlling the content of B upon the film formation of a seed layer to be 12 at. % in materials for forming the seed layer, i.e., Pd:B=88:12. The B content of the seed layer had the same value as that of the B content upon the formation of the recording layer. The B concentration in the film thickness direction was also measured by means of AES for the magnetic disk manufactured in Comparative Example 3. As a result, the B concentration of the recording layer in the vicinity of the boundary surface between the recording layer and the seed layer was 12.0 at. %, and the B concentration at the intermediate position in the film thickness direction in the recording layer was 12.0 at. %. The average B concentration of the recording layer was 12.0 at. %, and the average B concentration of the seed layer was 12.0 at. %. The decrease in B concentration in the direction directed from the boundary surface disposed on the side of the seed layer to the boundary surface disposed on the protective layer in the recording layer, which was observed in the magnetic disk manufactured in Example 9, was not observed for the magnetic disk manufactured in Comparative Example 3. That is, the concentration gradient of B did not appear in the film thickness direction of the recording layer in the magnetic disk manufactured in Comparative Example 3. Slf/Nd was measured for the magnetic disk manufactured in Comparative Example 3 in the same manner as in Example 1. As a result, Slf/Nd=17.2 dB was obtained.

According to the method for producing the magnetic recording medium of the present invention, the content of B in the seed layer is made sufficiently larger than the content of B in the recording layer upon the film formation. Accordingly, a part of B in the seed layer is diffused to the recording layer, the segregation of B is facilitate at the crystal grain boundary in the recording layer, and thus it is possible to further reduce the magnetic interaction between the crystal grains in the recording layer. Accordingly, it is possible to provide the magnetic recording medium in which the medium noise is reduced and information can be reproduced at a high S/N level. The magnetic recording apparatus, which is provided with the magnetic recording medium of the present invention, is excellent in thermal stability. Further, it is possible to provide the magnetic recording apparatus which is capable of performing the high density recording of not less than 60 Gbit/inch$^2$.

What is claimed is:

1. A magnetic recording medium comprising:
   a substrate;
   a backing layer which is formed of a soft magnetic material on the substrate;
   a seed layer which is formed of a non-magnetic material on the backing layer; and
   a recording layer which is formed adjacently on the seed layer, which includes crystal grains containing a hard magnetic material and a crystal grain boundary containing a segregation component, and which exhibits perpendicular magnetization, wherein:
   the segregation component has a concentration gradient in a film thickness direction in the recording layer so that the concentration of the segregation component decreases from a boundary surface of the recording layer disposed on a side of the seed layer toward a boundary surface of the recording layer disposed on a side opposite to the seed layer;
   wherein the segregation component is B, and the seed layer contains B;
   wherein an average concentration of B in the seed layer is higher than an average concentration of B in the recording layer; and
   wherein a relationship of B1>B2 holds between a B concentration B1 at the boundary surface of the recording layer disposed on the side of the seed layer and a B concentration B2 at an intermediate position between the boundary surface of the recording layer disposed on the side of the seed layer and the boundary surface of the recording layer disposed on the side opposite to the seed layer.

2. The magnetic recording medium according to claim 1, wherein the B concentration B1 is 17.0 to 70.0 at. %, and the B concentration B2 is 6.0 to 17.0 at. %.

3. The magnetic recording medium according to claim 1, wherein the concentration gradient of B is provided at 0.2 to 4.2 at. %/nm in the film thickness direction in the recording layer.

4. The magnetic recording medium according to claim 1, wherein the recording layer is formed of a multilayer film obtained by alternately stacking a platinum family metal containing B and Co containing B.

5. The magnetic recording medium according to claim 4, wherein the platinum family metal is at least one of Pt and Pd.

6. The magnetic recording medium according to claim 1, wherein oxygen is contained by not more than 10 at. % in the recording layer.

7. The magnetic recording medium according to claim 1, wherein the backing layer is formed of an alloy principally composed of at least one of Co and Fe and containing at least one element of B and C therein.

8. The magnetic recording medium according to claim 1, wherein the backing layer is formed of an amorphous alloy principally composed of CoZr and containing at least one element selected from the group consisting of Ta, Nb, and Ti therein.

9. The magnetic recording medium according to claim 1, wherein the backing layer has a structure obtained by dispersing a nitride or a carbide of at least one element selected from the group consisting of Ta, Nb, and Zr in Fe.

10. A magnetic recording apparatus comprising the magnetic recording medium as defined in claim 1, a magnetic head which records or reproduces information on the magnetic recording medium, and a drive unit which drives the magnetic recording medium with respect to the magnetic head.

* * * * *